350-377 SR XR 3,521,257

SEARCH ROOM

July 21, 1970 A. M. NELSON 3,521,257

MAGNETO-OPTICAL TRANSDUCER

Filed July 17, 1961 3 Sheets-Sheet 1

INVENTOR:
Alfred M. Nelson
By Smyth, Roston & Pavitt
Attorneys

3521257
OR IN 360/114

INVENTOR:
Alfred M. Nelson
By Smyth, Roston & Pavitt
Attorneys

INVENTOR:
Alfred M. Nelson
By Smyth, Roston & Pavitt
Attorneys 3,521,257
MAGNETO-OPTICAL TRANSDUCER Alfred M. Nelson, Redondo Beach, Calif., assignor to The Magnavox Company, Torrance, Calif., a corporation of Delaware Filed July 17, 1961, Ser. No. 124,676
Int. Cl. G11c *11/14, 11/42, 11/10*
U.S. Cl. 340—174.1 6 Claims

ABSTRACT OF THE DISCLOSURE

A magneto-optical transducer for optical read out of magnetic records by analyzing the Kerr effect or Faraday effect rotation of a polarized light beam which uses a thin film enhancement layer into which the information to be read is transferred. The enhancement layer may be cylindrical. Air bearing support may also be provided.

A magnetic-to-optical transducer and method in accordance with the invention described below makes it possible to bypass several limitations in the existing prior art, and to achieve important new advances in magnetic signal frequency response, bandwidth and wear reduction in tape reading and other equipment for transducing magnetic signals into corresponding electrical signals.

In general, the novel magneto-optical transducer and method of this invention involves establishing a magnetic relationship between a first magnetized medium and a thin magnetizable film so that the existing magnetic states of the former will be induced in the latter, and simultaneously transducing the induced magnetic states of the thin film into corresponding rotations of the major direction of polarization of a light beam reflected from the remote surface of the magnetized film. The rotation of the major direction of polarization of the reflected light beam occurring during this transduction is a manifestation of the Kerr magneto-optical effect, a phenomenon first reported by John Kerr in 1877. In this regard, the Kerr *magneto-optical* effect should be distinguished from the more widely known Kerr *electro-optical* effect. The latter phenomenon involves rotation of the plane of polarization of a polarized beam as the result of a double refraction which occurs in some materials when they are subjected to an electric field. The magneto-optical effect, however, occurs upon the reflection of a light beam from a magnetized surface.

It is conventional practice to sense magnetic signal states distributed longitudinally along the magnetic coating of a tape with pick-up heads of the induction type. Basically, the conventional pick-up head of this type involves the use of one or more electrical conductors carried by a magnetic structure disposed to intercept external magnetic flux from the tape as the latter is moved relative to the head. Hence, the magnetic signals carried by the tape are transduced directly into corresponding variations of electromotive force induced in the conductors of the pick-up head. This arrangement requires that the sensing conductors of the head be supported on a structure made of magnetic material having an open gap, usually in physical contact with the magnetized surface of the tape. This structure provides a magnetic circuit including the portion of the tape surface spanning the gap and the magnetic core material supporting the sensing conductors.

As a consequence of the frictional engagement between the pick-up head and the tape, the magnetic coating of the latter is subjected to continuous wear, an unfavorable factor which becomes particularly acute in tape readers designed for sensing magnetic signals extending over the video frequency bandwidth. For example, to utilize the inductive sensing technique under these conditions, it has been found necessary to provide the tape reader with a rotatable pick-up head which revolves around an axis generally aligned with the direction of the tape movement. In operation, the pick-up head is rotated at high speed so that the tape will be scanned transversely and repetitively as it passes by at a high linear rate.

Because of the limitation in the density of the discrete magnetic signals which can be recorded along a unit dimension of magnetic tape with existing techniques, it is necessary to record magnetic signals in the video frequency range on a wide tape and to utilize a recording head which rotates transversely with respect to the direction of tape motion. Inasmuch as the tape is wide, and a continuous physical contact between the periphery of the rotating head and the transverse surface of the tape must be maintained, considerable tension must be applied to the tape to insure that this contact will exist. This tension, together with the high relative speed of movement between tape and rotating head increases the rate of frictional wear so greatly that the useful life of video tape seldom extends beyond twenty-five playbacks.

Conventional magneto-electric transducers of the induction type are subject to several further disadvantages. Among these are impairment of operating characteristics as the result of oxide deposits built up in the gap on account of the physical contact and dynamic friction between the head and oxide coating of the tape. A further disadvantage is the limitation in frequency and density of discrete magnetic signals which the pick-up head can sense. This limitation arises from the necessity of making the contact surface of the pick-up head great enough to "gather" enough magnetic flux from the tape to induce in the sensing conductors signal voltages of detectable amplitude, and also because of the tendency of external magnetic flux from the tape surface immediately surrounding the contact area of the pick-up head to seek the low permeability path through the head. These characteristics of conventional pick-up heads also limit the density of magnetic signals which can be recorded and sensed along the transverse dimension of the tape.

From the foregoing, it should be understood that any pick-up head which dispenses with the need for physical contact between head and tape surface, and which further eliminates the requirement for establishment of a magnetic circuit external to the signal-bearing area of the tape, would be free from the disadvantages inherent in the use of conventional heads of the inductive sensing type. The possibility of realizing these advantages through use of the Kerr magneto-optical effect has intrigued workers in the art. Instead of transporting the tape in rubbing relation with the metal contact surface of a conventional pick-up, a successful application of the Kerr magneto-optical effect would make it possible to 'read" the magnetic states distributed on the tape merely by focusing a tiny spot of light on the magnetized surface. The small spot would not deform the normal external field of the tape, and it should be possible to make the spot somewhat smaller than the surface area of the tape occupied by a single magnetic state. As a result, the frequency sensitivity of the pick-up head, and the density of magnetic signal states per unit area could be increased enormously. Furthermore, the elimination of physical contact between the pickup surface and the tape surface should result in an important reduction in the rate of wear; and for the same reason, impairment of readout as the result of oxide build up would be obviated.

Although attempts previously have been made to utilize the Kerr magnetic-optical effect in "reading" magnetic signals directly from magnetic tape, these attempts generally have been unsuccessful on account of variations in the optical characteristics of the tape surface. These variations, in the form of light scattering attributable to oxide particles, and other surface irregularities, impose an undesirable modulation on the intensity of light reflected as the tape moves by. It is impractical to manufacture tape having a magnetic coating with suitable optical characteristics for direct readout. Furthermore, a tape surface having acceptable optical characteristics at the time of manufacture rapidly would be impaired in the course of repetitive tape readings with existing equipment.

In a copending patent application of this inventor, Ser. No. 88,833 filed Feb. 13, 1961, and assigned to the same assignee as this application, a magneto-optical transducer was disclosed wherein the problems found insurmountable in prior attempts to utilize the Kerr magneto-optical effect in reading magnetic tape are obviated. This is accomplished largely through use of an intermediate transfer of the tape information to a thin magnetic film of uniform optical characteristics shortly before optical readout. The thin magnetic film is disposed over the surface of a rotatable cylinder. The transfer of the magnetic information from tape to thin magnetic film occurs upon establishment of a direct rolling contact between the curved surface of the cylinder and the magnetic coating of the tape. The thin layer of magnetic film on the cylinder surface has a square-loop characteristic and an optimum coercivity. The coercivity of the film should be low enough to enable the magnetic state of the instantaneous transverse segment of the tape in contact with the cylinder to be induced in the film, with maximum retentivity. During operation, the tangential velocity at the surface of the rotating cylinder is equal to the linear velocity of the tape. This eliminates dynamic friction and helps preserve the optical characteristics of the thin magnetic film. As the cylinder rotates the successive magnetic signals present on the tape are transferred to and retained by the thin magnetic film.

After a given magnetic signal is transferred to the film, continued rotation of the cylinder carries the transferred signal through a small spot of linearly-polarized light. In accordance with the Kerr magneto-optical effect, the plane of rotation of the reflected light is displaced through an angle having a direction determined by the polarity of the signal state induced in the magnetized film. The resulting rotation is detected by an analyzer disposed so that its plane of polarization forms an acute angle, normally near 90°, with respect to the major direction of polarization of the incident light. As a result, the intensity of the light passing through the analyzer will be determined by the angle through which the plane of polarization is rotated. If the rotation is toward cross-polarization, the light through the analyzer will be diminished or extinguished. This will represent one of two magnetic signal states of the tape. However, if the rotation is in the opposite direction, more light will pass through the analyzer, an effect which will signify the opposite signal state of the tape. These fluctuations of intensity are then transduced by a photo-electric detector into corresponding changes of electric current or voltage.

After the transferred signal is read from the magnetic field in this manner, it is erased before the completion of a full revolution of the cylinder by a strong uni-directional magnetic field provided by a suitable permanent or electro-magnet mounted adjacent to the surface of the cylinder.

The transfer of magnetic signals from tape to magnetic film makes it easy to achieve a signal-bearing, magnetized surface having optimum optical characteristics for magneto-optical read-out. It is comparatively easy, for example, to control the deposition of a thin magnetic film around the surface of a small cylinder but it is difficult to achieve a like degree of control during the manufacture of magnetic tape.

The invention disclosed in the above cited application largely resolves the problem of providing a magnetic surface of uniform optical characteristics. However, it does not incorporate several capabilities of tape readers incorporating the improvements provided by the invention described below.

Through the use of the novel structure and method constituting the improvement of this invention, the aforementioned advantages of using the magneto-optical effect are retained, and several important structural and functional refinements are achieved. Among these are an output signal-to-noise ratio unaffected by dirt accumulations on the external surface of the thin film, cylinder eccentricities, surface irregularitries, and vibration of the supporting mechanisms, as a result of the tape and cylinder drive mechanisms.

Furthermore, unlike the invention described in the cited prior application, the invention described below does not require exacting control of the magnetic properties of the thin film vis a vis the properties of the magnetic coating on the tape in order to achieve a good transfer of magnetic signal states from the tape to the film. For example, the thin film of the cited application preferably should have a relatively high coercivity on the order of 10–80 oersteds, and a square-loop magnetization characteristic to insure maximum retentivity of the magnetic signal transferred from the tape. The improvements characterizing the invention disclosed in this patent application, however, eliminate the need for stringent control of the relative magnetic properties of the thin film and tape. This is true because the magneto-optical transduction occurs simultaneously with the induction of the magnetic signal from the tape to the film. Hence, it is unimportant whether the thin film has magnetic properties which enable it to retain a high degree of magnetization following exposure to the signal on the tape. It is necessary only that the thin film have a high permeability and a coercivity low enough to provide a good magnetic circuit for external flux in the vicinity of the tape surface.

In accordance with the embodiments described below, a magneto-optical transduction is accomplished by induction of the magnetic signals carried by the tape into an adjacent thin magnetic film while simultaneously scanning the remote surface of the thin film directly opposite to the point of induction with a small spot of incident light. Although the incident light preferably is polarized linearly, unpolarized light may be used.

As explained above, this use of the Kerr magneto-optical effect makes it possible to obtain a "reading" of the magnetic state induced on the remote surface of the thin film in terms of a rotation of the major direction of polarization of a light beam reflected therefrom through an angle greater or less than 180°. The direction of the angle of rotation is determined by the polarity of the magnetic field present at the reflecting surface of the film. Any rotation of the major direction of polarization after reflection from the film resulting in a non-parallel relationship with the major direction of polarization which would exist in the absence of a magnetic field at the reflecting surface, is translated into a change in light intensity in a direction determined by the direction of the rotation. The magnitude of the change in intensity is proportional both to the amount of reflected light and the amplitude of the angle of rotation. The resulting variations in light intensity then are transduced into corresponding electrical signals through use of a photo-electric detector.

In one embodiment of this invention, a thin magnetic film having a thickness of 500 to 2,500 angstroms is disposed over the convex surface of a transparent substrate. The substrate is supported in a fixed position, and the magnetic tape is disposed so that its magnetic coating may be moved in magnetic relation with respect to the magnetic film. A small spot of polarized light is focused through the transparent substrate onto a tiny area of the concave surface of the film directly opposite the closest point of the tape and then reflected to an optical analyzer-photodetector unit. In this embodiment, the tape is moved over the convex surface of the thin film. To minimize wear on the film and the tape, the thin film is coated with a thin layer of silicon monoxide. In a modification of this embodiment, the protective coating of silicon monoxide is omitted, and physical wear is rendered virtually insignificant through use of an air cushion a few molecules thick between the adjacent tape and film surfaces.

A second embodiment of this invention is characterized by a physical separation between the magnetic coating of the tape and the thin magnetic sensing film of a magneto-optical head. This mutually spaced-apart relationship is achieved by mounting the magneto-optical pickup head in a position relative to the magnetic coating of the tape where a magnetic relationship between tape and thin film will be established and preserved. It appears that this requirement will be satisfied if the separation is kept within a range extending from an indefinitely small minimum to about 0.001 inch maximum. In this embodiment, the pickup head is supported rigidly, and a guide roller for the moving tape is disposed fixedly in proximate relation to the thin film of the pickup head.

The tape then is transported through the resulting gap with its back surface held firmly against the guide roller and its magnetic coating in magnetic relation with the thin magnetic film of the pickup head. Inasmuch as the thin magnetic film of the pickup head preferably has a square-loop magnetization curve and low coercivity on the order of 2–20 oersteds, variations in the separation between the tape and film on account of variations in tape thickness will be inconsequential as long as the respective field strengths of the successive magnetic states carried by the tape are great enough to drive the thin film from saturation in one direction to saturation in the other, and vice versa. It should be noticed, of course, that thin films having low coercivities and a non-square loop magnetization curve could be used, but probably with some sacrifice in sensitivity.

In a third embodiment of this invention, the thin film is disposed on the external surface of a hollow, transparent, rotatable cylinder driven at a tangential surface velocity equal to the linear velocity of the passing tape. As in the preceding embodiments, the successive magnetic signal states of the tape are induced serially into the film and simultaneously read magneto-optically. Inasmuch as no relative movement occurs between the film and the tape, wear attributable to dynamic friction is nonexistent.

It should be noticed that all of the aforementioned modifications of this invention provide a reflective surface having easily controlled optical properties. In the embodiments where reading is accomplished through reflection from a portion of the surface of a thin film disposed in contiguous relation to the surface of a transparent substrate supported in a stationary position, the light is always reflected from the same point on the film and the area from which reflection occurs is permanently sealed between the surface of the substrate and the body of the film itself. This eliminates any possibility of impairment of optical properties as the result of dirt accumulations or mechanical wear of the film. Furthermore, the absence of mechanical movement of the substrate eliminates any noise factor attributable to vibrations of the driving mechanism. In the above-mentioned embodiment utilizing the rotating cylinder, reflection likewise occurs from the concave surface of the thin film sealed between the film itself and the outer surface of the hollow cylinder. For this reason, the optical conditions of read-out likewise can be optimized.

In all of the aforementioned embodiments, the rotation of the major direction of polarization of the reflected light beam may be amplified by a layer of transparent dielectric material of a few molecules thickness interposed between the thin magnetic film and its supporting structure. Silicon monoxide has been found to be especially useful for this purpose although good results may be obtained through the use of bismuth, stannic oxide, cadmium sulfide and other transparent dielectrics.

The foregoing paragraphs are intended to summarize and explain the significance of this invention in relation to the problems which it resolves, and should not be construed to narrow the scope of protection provided by the claims set forth hereinafter. For a more complete understanding of the structure, operation and novel features of the embodiments of this invention, consider the following description with reference to the drawings wherein:

FIG. 1 represents diagrammatically a first embodiment of this invention utilizing a stationary, arcuate pickup head;

FIG. 2 portrays the rotation of the major direction of the polarized light beam upon reflection of a magnetized surface;

Figures 1, 2, 3:
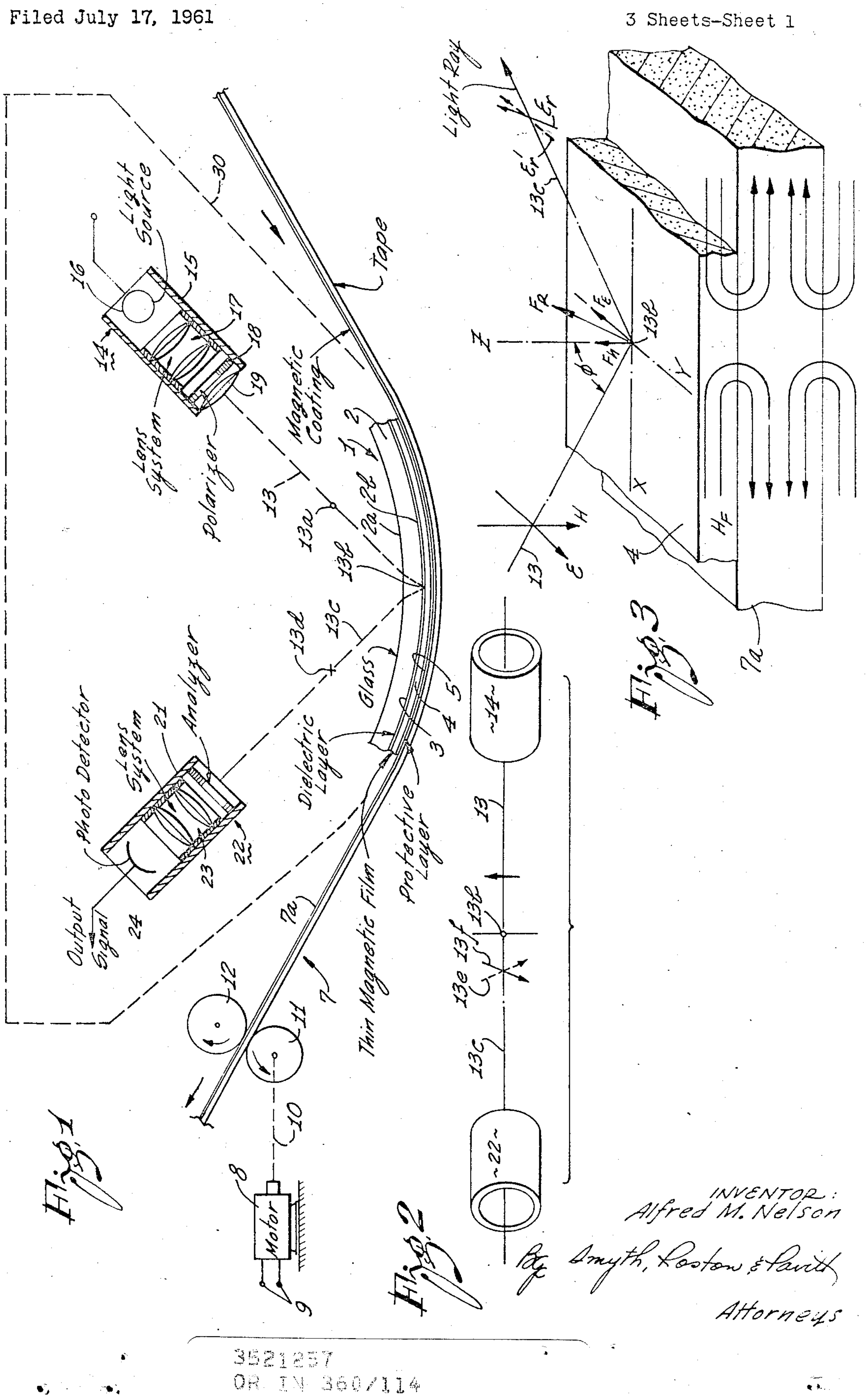
FIG. 3 is a composite vector diagram and fragmentary view of the thin magnetic film and magnetic tape coating helpful in explaining the Kerr magneto-optical effect.

As represented in FIG. 1, a principal embodiment of this invention includes a stationary magneto-optical read-out head 1 responsive to magnetic signals distributed longitudinally along magnetic tape 7. An electric motor 8 supplied with electric power at terminals 9 from a source (not shown) drives tape 7 from an input supply reel (not shown) via any conventional transport mechanism, represented symbolically as a mechanical linkage 10 and a capstan 11 rotating in cooperation with idler roller 12. The tape may be taken up on an output reel (not shown).

A beam 13 of light linearly polarized to have its electric intensity vector **13*a* parallel to a plane tangential to the reflecting surface at point 13*b* on magneto-optical pick-up 1 is generated by a light source 14. An optical-electrical transducer 22 is disposed in the path of light reflected from point 13*b* of the optical pick-up head 1 to detect any component of the reflected electric intensity vector 13*c* which is not parallel to the electric intensity vector 13*a*** of the incident beam, and to produce an electric signal representing the direction and magnitude of the displaced component.

It should be noticed that the direction of an eelctric intensity vector is rotated through an angle of 180° upon reflection from any surface. In FIG. 1 this phenomenon is represented by the cross designated **13*d*, showing that the electric vector 13*a*** has been rotated through an angle of 180°.

For simplicity, it was assumed that light beam 13 impinged on pick-up head 1 at a time when no magnetic flux was present at the point of incidence **13*b*. Hence, no detectable rotation has occurred and the reflected electric intensity vector 13*d* remains parallel to the electric intensity vector 13*a*** of the incident beam.

Although the light beam 13 utilized in the transducer of FIG. 1 of this invention and other embodiments is linearly polarized, it should be understood that magneto-optical detection may be accomplished through use of a non-polarized beam. In this instance, polarization in a major direction normally occurring upon reflection from any unmagnetized surface, will be displaced angularly from the usual direction of polarization by the magnetic field, if any, at the reflecting surface.

It is well known that upon reflection of an unpolarized light beam, the components of the beam perpendicular to the plane of incidence will be reflected with greater intensity than components which are parallel to the plane of incidence. Hence, the reflected light will have a major direction of polarization parallel to the reflecting surface. In accordance with the Kerr magneto-optical effect, this major direction of polarization then will be displaced through an angle having a direction determined by the polarity of any magnetic field which may exist at the reflecting surface. Thus, the reflected light beam will carry an optical representation of the state of magnetization at the reflecting surface in the form of a rotated major direction of polarization forming an acute angle with respect to the major direction of polarization which would exist in the absence of a magnetic field. Through the use of the optical-electric transducer 22, this optical representation may be detected and transduced into an electrical signal representing the presence and polarity of a magnetic state at the reflecting surface.

All of the optically active components of the embodiment represented in FIG. 1, including light source 14 and the optical electric transducer 22 are enclosed by a light-proof housing, symbolically represented by dotted line 30. The magneto-optical pick-up head 1 may be incorporated at any convenient location in the wall of the housing 30.

The magneto-optical pick-up head 1 is made up of an arcuate transparent substrate 2 having a concave inner surface 2*a* and a convex outer surface 2*b*. The convex outer surface 2*b* is coated with a layer of transparent dielectric material a few molecules thick. Overlying the dielectric layer is a thin magnetic film having a thickness of 500 to 2,500 angstroms. A thin protective layer 5 of hard, smooth, wear-resistant material is disposed over the surface of thin film 4.

The arcuate substrate 2 may be made of any material having the requisite optical properties, Pyrex glass, for example. The dielectric layer 3 is provided for the purpose of amplifying the rotation of the major direction of polarization of light reflected from point 13*b* of thin film 4. It has been found, for example, that a silicon monoxide layer will increase the angle of rotation by as much as a multiple of 5. Other dielectrics like bismuth, stannic oxide, cadmium sulfide, and materials of this type, will amplify the resulting rotation by as much as a factor of 3. The amplification phenomenon is not understood fully. However, it appears from experimental evidence that the magnitude of amplification is related to the relative refractive index between thin magnetic film 4 and the dielectric layer 3. In fact, it has been theorized that amplification varies directly as a function of the relative index of refraction.

The thin magnetic film 4 may be comprised of iron, a nickel-iron alloy or any other highly-magnetizable material of low coercivity. This film may be applied to the external surface of the dielectric layer 3 through the use of conventional vacuum deposition techniques. It is desirable, however, to effect the deposition of the magnetic film under the influence of a magnetic field oriented in a direction parallel to the plane of incidence at point 13*b* so that the "easy" direction of magnetization of the film will be parallel to the external magnetic flux representing the signal states of magnetic tape 7. This will result in optimum values for the coercivity of the magnetic film. Furthermore, this orientation in the "easy" direction of magnetization will make it possible to maximize the thickness of the film without exceeding the thickness of a single magnetic domain.

Although experimental results have indicated that a magneic film having a thickness of 500 to 2,500 angstroms will be satisfactory for most purposes, the important criterion is that the film thickness not exceed a single magnetic domain. This is desirable for maximum sensitivity and response to magnetic signals carried on tape 7.

Inasmuch as the signal carried by tape 7 is induced in thin film 4 and read simultaneously, it appears to be unnecessary that thin film 4 have a square-loop magnetization characteristic. While the tape 7 and thin film 4 are in proximate relation, the magnetic state of the latter is induced and controlled by the former. Because the induced magnetic state is read at this time, it is unnecessary that the induced magnetic state be retained by film 4 after it is no longer in magnetic relation to the portion of tape 7 carrying the induced signal. This means that the deposition of suitable films for use with pick-up head 1 is a less critical operation and may be accomplished more economically.

The protective coating 5 applied to the external surface of magnetic film 4 may be formed from silicon monoxide, chromium, rhodium or other hard, smooth, wear-resistant material. The purpose of the protective layer 5 is to prevent physical contact between the external surface of thin film 4 and the magnetic coating 7*a* of tape 7, so that wear on the thin film attributable to dynamic friction will be eliminated and the magnetic characteristics of the film will be preserved. Inasmuch as the protective coating is extremely hard and smooth, the resulting wear on the magnetic coating 7*a* of tape 7 is nominal. The thickness of the protective coating 5 should be optimized to provide as long a life as may be consistent with effective magnetic induction of the signal state carried by the tape.

In accordance with this invention, a magneto-optical head having a structure of the type described above, is characterized by an output signal-to-noise ratio somewhat lower than that attainable heretofore. This is true because the optical characteristics of the pick-up are unaffected in the course of operation. The point of incidence 13*b* of polarized light beam 13 is stationary, and is protected fully against dirt by glass substrate 1, and the full thickness of the thin film 4 and protective layer 5. As a result, sources of noise like those encountered in the use of a dynamic head of the type disclosed in the cited patent application are entirely eliminated.

The light source 14 provides a beam 13 of linearly-polarized light having its electric intensity vector parallel to the reflecting surface at point 13*b* of pick-up head 1. The light source 14 is supported so that the angle of incidence of the beam 13 at point 13*b* is acute. Experimental results indicate that an angle of incidence of 60° will maximize the magneto-optical effect. As represented in FIG. 1, the light source 14 is comprised of housing 15 containing a source of illumination 16, a collimating lens system 17, a plane-polarizing element 18, and a focusing lens 19.

The optical-electric transducer 22 is disposed in a position to intercept light reflected from the point of incidence 13*b*, and is made up of a housing 21 containing an analyzer 22, a focusing lens system 23, and a photoelectric detector 24. The analyzer is oriented in housing 21 so that its single plane of light transmission forms an acute angle, normally near, but not equal to 90°, with respect to the plane of polarization of light supplied from source 14. As a result, any rotation of the major direction of polarization of light reflected from point 13*b* in a first direction will reduce the intensity of the light passed by the analyzer, but a rotation in the opposite direction will increase the intensity of the transmitted light. Inasmuch as the direction of angular rotation of the reflected light from a parallel relationship with the direction of polarization of the incident beam will be determined by the polarity of the magnetization induced in film 4 at the point of incidence 13*b*, the change in the intensity of light passed through analyzer above and below a reference level will represent the polarity of the magnetic signal currently being read. This fluctuation of light intensity is then transduced by the photo-detector 24 into a corresponding change in electrical current or voltage. The photo-detector 24 may be a photoconductor, photomultiplier, vidicon, or other light responsive device.

The angular rotation of the major direction of polarization of an incident plane-polarized light beam occurring upon its reflection from a magnetized surface is depicted in FIG. 2. Here, the source 14 of plane-polarized light generates a light beam 13 having its electric intensity vector 13*a* oriented in a direction parallel to a plane tangent to the reflecting surface of film 4 at the point of incidence 13*b*. Upon leaving the point of incidence 13*b*, the reflected light beam 13*c* will be polarized elliptically, and will have a major direction of polarization rotated at an angle slightly more or less than 180° from the direction of polarization of the incident light. This rotation is indicated by the electric intensity vectors 13*d* and 13*f*. Only one vector would be present, however, at any given time and its direction of angular displacement will be determined by the polarity of the magnetic field parallel to the reflecting surface of film 4 at the point of incidence 13*b*. The optical-electric transducer 22 detects the direction and magnitude of the rotation and produces a corresponding electric signal output in the manner described above.

Although the magneto-optical phenomenon manifested by the rotation of the major direction of polarization in a light beam reflected from a magnetized surface was discovered first by John Kerr in 1877, workers in the field are not in general agreement as to the correct physical explanation of this effect. Expressed qualitatively, one explanation of the magneto-optical effect is represented in the vector diagram of FIG. 3. A ray of light 13 is shown impinging at an angle on thin film 4 at point 13*b*. The thin film 4 has been magnetized as a result of the magnetic signal state carried in magnetic coating 7*a* of tape 7. As a result, the surface of thin film 4 at the point of incidence 13*b* is magnetized in the direction of the flux lines $H_f$. The direction of the field $H_f$ is parallel to the reflecting surface at point 13*b*. The light beam 13 has been linearly polarized so that its electric intensity vector E is parallel to the reflecting surface at point 13*b* and its associated magnetic component H is oriented in a direction normal to the plane containing vector E and light ray 13. The angle O at which polarized light beam 13 is incident on the surface of thin film 4 is acute, and may be equal to 30°, an angle empirically found to produce a maximum angular displacement of the major direction of polarization of a light beam upon reflection from a magnetized surface.

When the incident light ray 13 impinges on the surface of thin film 4 at point 13*b*, the electric intensity vector E results in a force $F_e$ on the affected boundary electrons of the material. This force is displaced 180° from the direction of E. As a result of the magnetic vector H of the incident beam, any resulting movement of the affected electrons caused by $F_e$ result in a component of force $F_h$ oriented in a direction normal both to the force $F_e$ and to the ambient magnetic field $H_f$ at point 13*b*. Hence, $F_h$ will be proportional to electron velocity and to the intensity of the magnetic field $H_f$ at the surface of the film. The resultant force $F_r$ of the first and second components $F_e$ and $F_f$, respectively, will cause an angular displacement in the principal direction of motion of the affected electrons with the result that path of motion of these electrons will described an arc. Consequently, the reflected light beam 13*c* generated from this motion will be polarized elliptically with the major axis of electric intensity angularly displaced from that of the electric intensity vector E of the incident ray 13. As shown by the electric intensity vectors $E_r$ and $E'_r$, this displacement may occur in either direction with reference to the direction of E in the incident light ray 13. The amplitude of the angle by which electric intensity vector $E_r$ or $E'_r$ is displaced with respect to vector E of the incident light beam will be proportional to the surface magnetization $H_f$ at the point of incidence 13*c*, and to the cosine of the angle between the electric intensity vector E and the direction of polarization of $H_f$. Whether the direction of displacement of the electric intensity vector of the reflected beam will be in the direction of $E_r$ or $E'_r$ will depend on the direction of polarization of the magnetic field $H_f$.

It is not expected that the rate of wear resulting from the dynamic friction between the magnetic coating 7*a* of tape 7 and the protective coating 5 of the magneto-optical head 1 will affect the practicability of transducers in accordance with the embodiment of FIG. 1. If the rate of wear should prove to be a problem, however, the improved embodiment represented in FIG. 4 obviate this problem. This embodiment differs from that of FIG. 1 only in the structure of the magneto-optical pick-up head. The magnetic tape 7, drive motor 8, mechanical coupling 10, capstan 11, drive roller 12, light source 14, and optical-electric transducer 22 remain unchanged.

The improved pick-up head 40 comprises a transparent substrate 41 having groove 41*a* of semicircular cross section disposed transversely across one end. The groove 41*a* provides a mounting space for a roller 42. The roller 42 is mounted between side plates 43 and 44 secured, respectively, to opposite sides of substrate 41. A dielectric layer 3 and a thin magnetic film 4, like those described for the pick-up head 1 of FIG. 1 are disposed in the order named on the surface of substrate 41 containing the groove 41*a*. The width of the substrate 41 is made approximately equal to the width of the tape with which the pick-up head 40 is to be used, and the side plates 43 and 44 have edges which extend slightly beyond the surface of the thin magnetic film 4 to provide a guide channel for tape 7. The side plate 44 has an opening 45 adapted to receive a pipe 46 coupled to a source of low pressure air (not shown). A sealing flap 47, secured to the end of substrate 41 adjacent to groove 41*a*, has a portion 47*a* extending beyond groove 41*a*, and in contact with the surface of roller 42.

In operation, the tape 7 moves by the stationary magneto-optical pick-up head 40 in the direction of the arrow. At pick-up head 40, the tape 7 physically engages the peripheral surface of roller 42, and thereby establishes an effective seal against the escape of air from groove 41*a* without producing dynamic friction. From the peripheral surface of roller 42, tape 7 moves proximately to the surface of thin film 4, being separated therefrom by a fixed distance of molecular dimensions. This separation is produced by the escape of low pressure air between the adjacent surfaces of the film 4 and the tape 7. Hence, the magnetic coating 7*a* of tape 7 is in effective magnetic relationship with thin film 4, although separated therefrom by one or more molecules of low pressure air. Inasmuch as the surfaces are never in physical contact, wear attributable to dynamic friction cannot occur.

Figures 4, 5, 6:
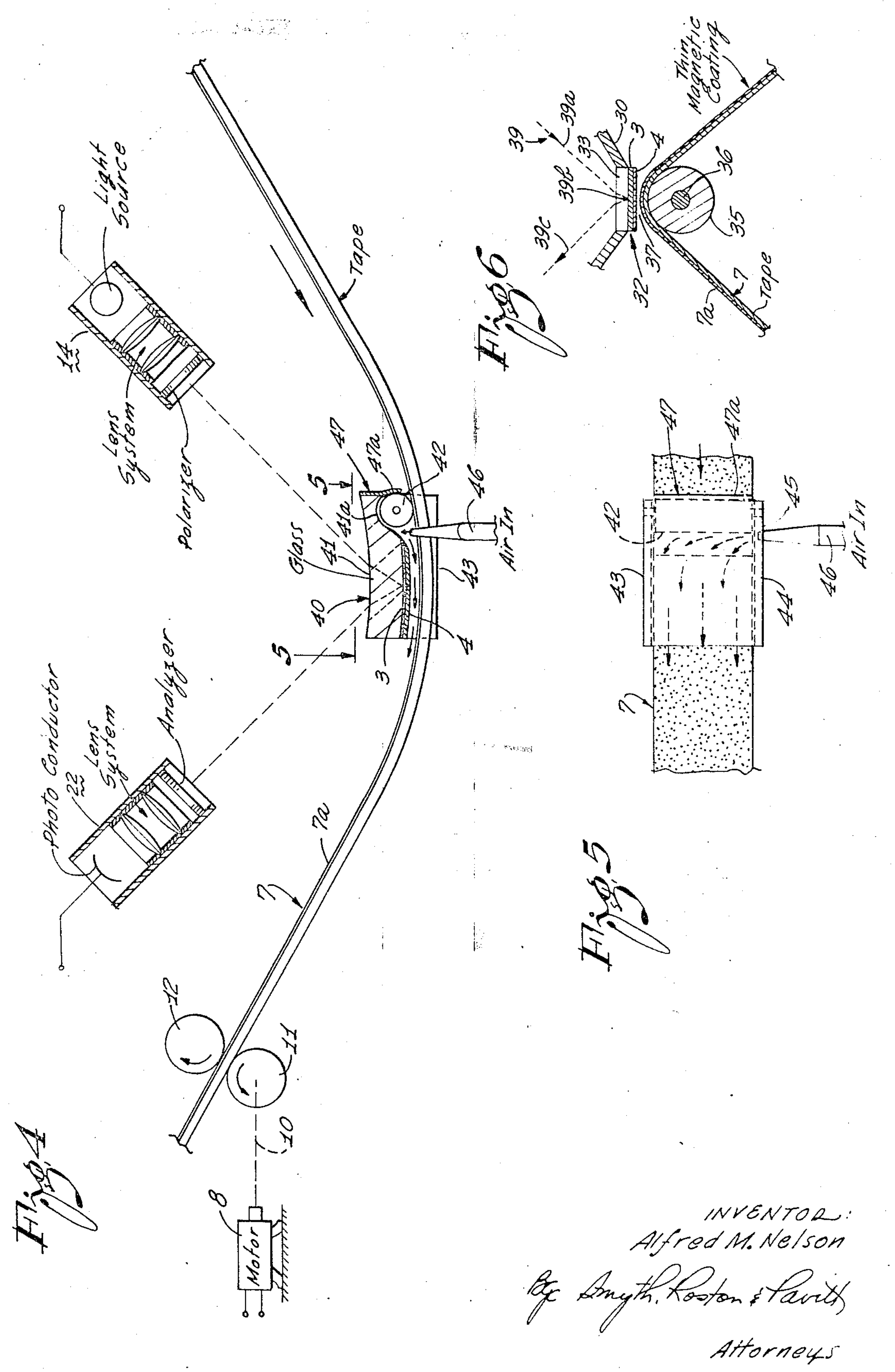
FIG. 4 is a diagrammatic representation of a modification of the first embodiment of this invention wherein an air cushion is developed between the thin magnetic film and the magnetic coating of the tape in order to maintain a constant separation betwen the two.
FIG. 5 is a plan view of the read-out head of FIG. 4.
FIG. 6 represents diagrammatically a second embodiment of this invention wherein the tape is supported and driven in spaced-apart, but magnetic, relation to the thin magnetic film of the pickup head.

In a second embodiment of the invention represented in FIG. 6, the need for an air cushion in order to maintain physical separation between the magnetic coating 7*a* of tape 7 and the thin magnetic film 4 of the magneto-optical pick-up head 32 is eliminated. This result is achieved by driving the tape 7 longitudinally over a guide roller 35 spaced apart from the thin magnetic film 4 of magneto-optical head 32 by a minimum distance slightly greater than the maximum thickness of magnetic tape 7. Thus, short separation, preferably within the range extending from an indefinitely small minimum to a maximum of about 0.001 inch, is established and maintained between the magnetic coating 7*a* of tape 7 and the thin magnetic film 4. To avoid wear from dynamic friction and minimize the load on tape 7, the guide roller 35 is mounted for rotation around an axis 36.

The magneto-optical pick-up head 32 comprises a composite laminar body made of a flat, transparent substrate 33 having a thin transparent layer 3 of dielectric material, and a thin film 4 of magnetic material applied in succession to one of its flat surfaces. The magneto-optical pick-up head 32 may be supported fixedly in housing 30 disposed, in turn, on any conventional base (not shown) so that the thin magnetic film 4 is spaced slightly apart from the adjacent surface of the magnetic coating *7a* of tape 7. The substrate 36, dielectric layer 3, and thin film 4 may be formed from the materials and have the properties and features described above in reference to the embodiments of FIGS. 1 and 4.

Read-out of the magnetic states induced serially in the thin magnetic film 4 of pick-up head 32 is accomplished optically in the manner described previously in connection with FIGS. 1–5, inclusive, by directing a light beam 39 onto the surface of thin film 4 at point *39b*, so that the major direction of polarization of the reflected beam *39c* will have a non-parallel relationship with respect to the major direction of polarization which would exist if thin film 4 were to be unmagnetized. The resulting rotation of the major direction of polarization of the reflected beam *39c* then is detected with an optical-photodetector unit (not shown) like the unit 22 described above with reference to FIGS. 1 and 4.

Inasmuch as guide roller 35 and the magneto-optical pick-up head 32 are mounted a fixed distance apart, the gap 37 separating the thin magnetic film 4 from the magnetic coating *7a* of tape 7 will be determined by the thickness of the latter. Because this thickness normally will vary in random fashion, the gap 37 will increase or diminish accordingly. To prevent this variation in the size of gap 37 from imposing an undesired modulation on the signal output of the transducer, it is necessary only to use a thin film 4 having a square-loop magnetization characteristic and a low coercivity, preferably about 2 oersteds, and to fix the spacing between guide roller 35 and pick-up head 32 so that gap 37 never becomes so great that the external magnetic fields emanating from the adjacent surface of the magnetic coating *7a* and intercepting thin film 4 will be too weak to drive the latter from saturation in one direction to saturation in the other, and vice versa. Hence, where the tape coating *7a* is typical of those now commercially available and magnetic signal states carried thereon represent digital information, it is improbable that pick-up head 32 will fail to register the magnetic states of tape 7 unless the length of gap 37 becomes greater than 0.001 inch.

It should be apparent that a coating like the coating 5 described above with reference to FIG. 1 may be applied to the exterior surface of thin film 4 to protect the latter from wear or damage in the event of occasional physical contact between tape 7 and the pick-up head 32. Furthermore, the thin film 4 may have a non square-loop characteristic, if some sacrifice of sensitivity is unobjectionable.

Figure 7:
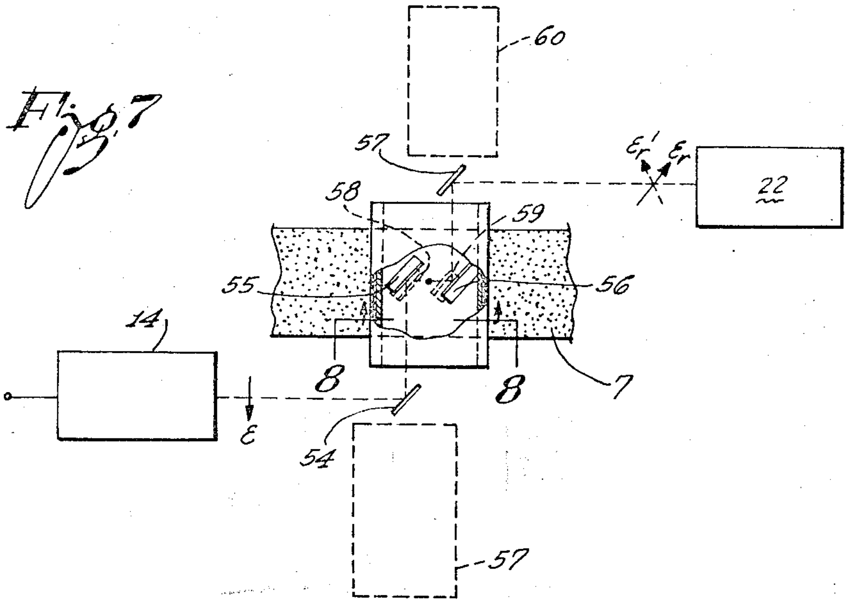
FIG. 7 is a plan view of a third embodiment of this invention utilizing a rotating cylinder for accomplishing read-out.
Figure 8:
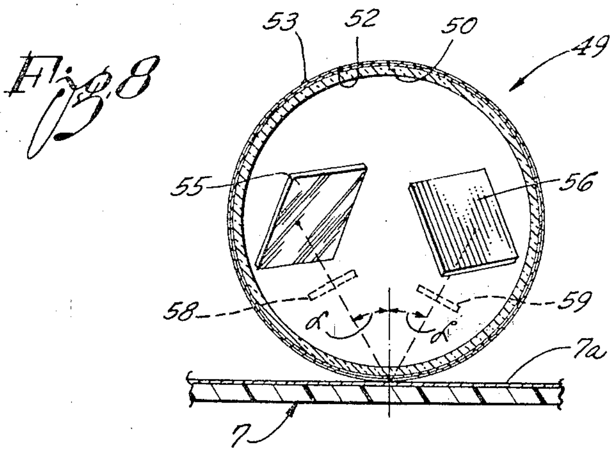
FIG. 8 is a cross-section in elevation of the read-out cylinder of FIG. 7.

A third embodiment of this invention which provides freedom from wear attributable to dynamic friction while achieving a uniformity of optical characteristics comparable with those of the embodiments just described is represented in FIGS. 7 and 8. In this embodiment, a hollow cylinder 50, made of glass or other non-magnetic transparent material, is mounted for rotation around an axis disposed in transverse relationship to the direction of movement of tape 7 .The peripheral surface of cylinder 50 is covered with a coating of transparent non-magnetic dielectric material 52 and this, in turn, is covered with a thin magnetic film 53. The magnetic tape 7, while moving in the direction of the arrow, is in rolling engagement with cylinder 50. If necessary, the cylinder 50 may be rotated by any one (not shown) of several conventional mechanisms at a tangential surface velocity equal to the linear velocity of tape movement. Furthermore, the contiguous relationship between the magnetic coating *7a* of tape 7 and the thin film 53 disposed on the surface of cylinder 50, insures that an efficient induction of the successive magnetic signal states carried by tape 7 into thin film 53 will occur. The respective compositions and other physical and functional characteristics of the dielectric coating 52 and the thin magnetic film 53 may be the same as dielectric coating 3 and thin film 4 described above for the embodiments of FIGS. 1, 4 and 6. Furthermore, a protective layer of silicon monoxide or other non-magnetic material may be disposed over the surface of thin film 53 if such is found to be necessary or desirable.

As in the case of the embodiments represented in FIGS. 1, 4 and 6, magneto-optical transduction occurs simultaneously with the induction of the magnetic signal states carried by tape 7 into the thin magnetic film 53 of the rotating pick-up head 49. In this instance, magneto-optical read-out is accomplished by focusing a beam 13 of light from light source 14 onto a point of incidence *13b*. The incident beam 13 has its electric intensity vector oriented in a direction parallel to a plane tangent to the thin film at the point of incidence *13b*. The path of the light beam from the light source 14 is from mirror 54 to mirror 55, and thence to point of incidence *13b* on the inner surface of thin magnetic film 53. From this point, reflected light passes successively to mirror 56, mirror 57 and the optical-electric transducer 22. If the thin film 53 at the point of incidence 13b is magnetized at the time of reflection, the direction of the electric intensity vector $E_r$ of the reflected beam *13c* will be displaced from its usual parallel relationship with the E vector of the incident beam. As shown by vectors $E_r$ and $E'_r$, this displacement may occur in either direction. The angular displacement of the principal electric intensity vector of the reflected beam is detected and transduced into an electric output signal having a voltage or current characteristic representing the state of the magnetic signal induced in thin film 53 from tape 7.

An alternative arrangement for providing polarized light at the point of incidence *13b* is represented in dotted lines in FIGS. 7 and 8. In accordance with this alternative, a non-polarized beam of light is supplied from a source 57 to mirror 55. The non-polarized light then passes through a polarizer 58 to the point of incidence *13b*. Upon reflection from *13b*, the reflected beam passes through the analyzer 59, and any light transmitted by the latter then is reflected from mirror 56 directly into optical-electric transducer 60. The light source 57 and the optical-electric transducer 60 are essentially similar to the light source 14 and the optical-electric transducer 22. The principal difference between light source 57 and light source 14 is that the polarizer of the former has been moved in position from its proximate relation to the source into a position between mirror 55 and the point of incidence *13b*. Likewise, the principal difference between optical-electric transducer 60 and the transducer 22 is that the analyzer 59 has been moved from the transducer assembly to a position where it intercepts the segments of the reflected light beam *13c* between the point of incidence *13b* and mirror 56.

The point of incidence *13b* of light beam 13 on the thin magnetic film 53 is at a point on the inner surface of the latter, so that it is permanently sealed against dirt, discoloration, other deterioration which may be caused by dynamic friction or exposure to the air. As a result, a magneto-optical transducer constructed as shown in FIGS. 7 and 8 also is characterized by a superior signal-to-noise ratio.

As the term "directly" is used in the claims with respect to the transfer of information from the tape 7 to the thin film 4, it indicates that the transfer occurs without the help of any additional members such as coils. For example, coils similar to the coil 14 in Camras Pat. 2,747,027 are not required.

The representations in the drawings and the foregoing text are intended merely to facilitate the practice of this invention by persons skilled in the art, not to restrict its scope. Moreover, it is obvious that many variations and substitutions may be made with respect to the embodiments described above while remaining within the scope of this invention as set forth in the following claims:

I claim:

1. A magneto-optical transducer for producing non-magnetic representations of magnetic states of a first magnetizable material movable in a particular direction and having a particular coercivity, the said magneto-optical transducer including:

a second magnetizable, material of sheet-like configuration having first and second opposite surfaces each with a particular portion, the second magnetizable material being disposed relative to the first magnetizable material to have at least the particular portion of the first surface exposed to light and the particular portion of the second surface in a magnetic relation to the first material, the second magnetizable material further having a permeability and a coercivity relative to the first magnetizable material to enable the induction of the magnetic states of the first material directly through the second surface of the second material to the first surface of the second material;

a transparent dielectric layer disposed on the second surface of the second magnetizable material and forming with the second magnetizable material a composite laminar coating providing an amplified rotation of light relative to that provided by the second magnetizable material alone;

a layer of wear-resistant material disposed on the transparent dielectric layer;

means coupled at least to the first magnetizable material for producing relative motion between the first and second magnetizable materials in the particular direction so that the magnetic states of the first magnetizable material will be induced on the second magnetizable material and represented serially by corresponding magnetic states on the first surface of the second magnetizable material;

means disposed relative to the first and second magnetizable materials for producing an air cushion between the materials during the relative movement between the materials in the particular direction;

a source of light oriented toward the particular portion of the first surface of the second material, so that light reflected from the first surface will be rotated in accordance with the magnetic states on the first surface of the second magnetizable material; and output means disposed in the path of the reflected light and responsive to the reflected light for producing a signal having characteristics representing the direction and magnitude of the rotation.

2. A magneto-optical transducer for producing non-magnetic representations of magnetic states of a first magnetizable material movable in a particular direction and having a particular coercivity, the magneto-optical transducer including:

a transparent substrate;

a transparent film of dielectric material disposed on the substrate;

a thin, sheet-like film of magnetizable material overlying the film of dielectric material and disposed in proximate relationship with the first magnetizable material to receive directly the magnetic states of the first magnetizable material and to form, with the film of dielectric material, a composite laminar coating having properties to produce a greater rotation of light in accordance with the magnetic states on the film of magnetizable material than that produced by the film of magnetizable material alone;

means disposed relative to the first magnetizable material and the film of magnetizable material for establishing an air cushion between the first magnetizable material and the film of magnetizable material to prevent dynamic friction and inhibit wear;

means coupled at least to the first magnetizable material for producing relative motion between the first magnetizable material and the film of magnetizable material so that the successive magnetic states of the first magnetizable material in the particular direction will be induced in the film of magnetizable material and represented serially by corresponding magnetic states in the film of magnetizable material;

a source of polarized light having at least a particular direction of polarization, the source being oriented toward the composite laminar coating and disposed at an angle with respect to the composite laminar coating so that light transmitted through the dielectric layer and reflected from thesurface of the film of magnetizable material may have a major direction of polarization displaced angularly with respect to the particular direction of polarization of the transmitted light; and means disposed in the path of the light reflected from the composite laminar coating and producing a signal having characteristics representing the direction and magnitude of the angular displacement of such light.

3. The magneto-optical transducer set forth in claim 2 wherein the substrate is provided with a groove at a position near the first magnetizable material and wherein the groove is provided with a slope in the particular direction of movement of the first magnetizable material and wherein a roller is supported for rotation in the groove on an axis transverse to the particular direction of movement of the first magnetizable material and wherein a source of air at low pressure is provided and wherein the air at low pressure is supplied to the groove and is provided with an escape path between the first magnetizable material and the film of magnetizable material to produce the air cushion between the first magnetizable material and the film of magnetizable material.

4. A magnetic-optical transducer for producing a non-magnetic representation of the magnetic states of a first magnetizable material movable in a particular direction and having a particular coercivity, the magnetic-optical transducer including:

a thin magnetizable film having first and second opposite surfaces and having an arcuate configuration;

means disposed relative to the thin magnetizable film for maintaining the first magnetizable material in contiguous relationship to the second surface of the thin magnetizable film along the arcuate configuration of the thin film to obtain a direct transfer of information from the first magnetizable material to the thin magnetizable film;

means operatively coupled to the first magnetizable material for obtaining a movement of the first magnetizable material in the particular direction along the second surface of the thin magnetizable film;

a source of light oriented toward a particular position on the first surface of the thin magnetizable film and disposed at an acute angle with respect to the first surface of the thin film, so that light passing from the film may have a major direction of polarization roated relative to the light directed toward the film in accordance with the magnetic states of the first magnetizable material at successive positions in the particular direction; and means disposed in the path of the light passing from the thin magnetizable film and responsive to the polarization of such light for producing signals having characteristics representing the direction and magnitude of the angular displacement of such light.

5. A magnetic-optical transducer for producing a non-magnetic representation of the magnetic states of a first magnetizable material movable in a particular direction and having a particular coercivity, the magnetic-optical transducer including:

a thin magnetizable film of arcuate configuration and having a first surface of concave configuration and a second surface opposite to the first surface and following the configuration of the first surface and having a coercivity less than the particular coercivity;

a layer of dielectric material overlying the first surface of the thin film to form, with the thin film, a composite laminar coating having properties of producing a greater rotation of light directed to the coating than that produced by the thin film alone;

a source of polarized light having at least a particular direction of polarization, the source being oriented toward the first surface of the thin film and being disposed at an acute angle with respect to the first surface of the thin film, so that light passing from the film may have a direction of polarization displaced angularly with respect to the particular direction of polarization;

means disposed relative to the thin film for maintaining the first magnetizable material in contiguous relationship to the second surface of the thin magnetizable film along the arcuate configuration of the thin film;

means operatively coupled to the first magnetizable material for obtaining a movement of the first magnetizable material in the particular direction along the second surface of the thin magnetizable film; and means disposed in the path of the light passing from the thin magnetizable film and responsive to such light for producing electrical signals having characteristics representing the direction and magnitude of the angular displacements of such light.

6. In a magneto-optical transducer for producing non-magnetic representations of the various magnetic states in a particular direction of a magnetized material having a particular permeability and a particular coercivity and movable in the particular direction and disposed in magnetic relation with the transducer to obtain an inducing of the magnetic states in the magneto-optical transducer and to produce a rotation of light directed to the transducer and to produce such light rotation in accordance with the magnetizing of the transducer by the magnetized material;

a substrate;

a thin magnetizable film disposed on the substrate and having a permeability and a coercivity less than those of the magnetized material to enable induction of the magnetic states of the magnetized material into the thin magnetic film;

a layer of dielectric material disposed on the thin magnetizable film and forming, with the thin magnetizable film, a composite laminar coating producing an amplification greater than unity in the rotation of light passing from the thin magnetizable film relative to that produced by the thin film alone, the rotation in the light directed to the thin magnetizable film being produced in accordance with the magnetic states induced in the thin magnetizable film from the magnetized material, and means disposed relative to the magnetized material and the thin magnetizable film for maintaining an air cushion between the magnetized material and the thin magnetizable film.

References Cited

UNITED STATES PATENTS 2,984,825 5/1961 Fuller et al. ---------- 340—174

OTHER REFERENCES

"Magneto-Optical Recording System," by J. J. Hagopian and E. J. Supernowicz, IBM Tech. Bull., vol. 3, August 1960, pp. 67–68.

TERRELL W. FEARS, Primary Examiner

U.S. Cl. X.R.

179—100.2; 346—74